United States Patent [19]

Fujimura et al.

[11] Patent Number: 4,984,087
[45] Date of Patent: Jan. 8, 1991

[54] MICROPHONE APPARATUS FOR A VIDEO CAMERA

[75] Inventors: Katsunori Fujimura; Hiroshi Saitoh, both of Yokohama; Michio Matsumoto, Sennan, all of Japan

[73] Assignee: Matsushita Electric Industrial Co., Ltd., Osaka, Japan

[21] Appl. No.: 358,299

[22] Filed: May 26, 1989

[30] Foreign Application Priority Data

May 27, 1988 [JP] Japan .................... 63-130675
Sep. 9, 1988 [JP] Japan .................... 63-227007

[51] Int. Cl.⁵ .......................................... H04N 5/225
[52] U.S. Cl. ............................... 358/225; 352/5
[58] Field of Search ............ 358/225, 906; 352/5, 352/27

[56] References Cited

U.S. PATENT DOCUMENTS

| 3,837,736 | 9/1974 | Ogiso et al. | 352/12 |
| 4,472,742 | 9/1984 | Hasegawa et al. | 358/227 |
| 4,531,822 | 7/1985 | Shenk | 354/401 |
| 4,594,610 | 6/1986 | Patel | 358/144 |
| 4,862,278 | 8/1989 | Dann et al. | 358/225 |

OTHER PUBLICATIONS

"Zoom Microphone," Yukinobu Ishigaki et al., Presented at 67th Convention, Audio Engineering Society, Oct. 31–Nov. 3, 1980, New York, NY.

Primary Examiner—Stephen Brinich
Attorney, Agent, or Firm—Schwarze, Jacobs & Nadel Panitch

[57] ABSTRACT

A microphone apparatus for a video camera having a zoom lens, comprising: a superdirectional microphone fro generating a superdirectional microphone signal D; a stereo microphone for generating stereo microphone signals L and R; a zoom position sensor for generating a zoom position signal; first and second signal means for generating control signals Vc1 and Vc2 which can be changed according to the zoom position signal; a first amplifier for generating a first amplified signal K1·D (K1 is a value corresponding to Vc1); a second amplifier for generating a second amplified signal K2·L (K2 is a value corresponding to Vc2); a third amplifier for generating a third amplified signal K2·R; a first adder for generating a first sum signal (k1·D+K2·L); and a second adding means for generating a second sum signal (k1·D+K2·R). The directivity can be varied in accordance with the control of the zoom lens to suitably match images and sounds.

15 Claims, 12 Drawing Sheets

MICROPHONE APPARATUS FOR A VIDEO CAMERA

BACKGROUND OF THE INVENTION

1. Field of the invention

This invention relates to a microphone apparatus for a video camera which is equipped with an optical zoom lens and microphones to provide video and audio signals to a video tape recorder. More particularly, this invention relates to a microphone apparatus the directivity of which can be varied in accordance with the control of the zoom lens to suitably match images and sounds.

2. Description of the prior art

Microphone apparatus for producing acoustic zoom effects on the basis of monaural sound recording in which the directivity or both the directivity and the sensitivity of a microphone are varied have been proposed (for example, Y. Ishigaki et al.: "Zoom Microphone" presented at the 67th Convention of the Audio Engineering Society (Oct. 31 to Nov. 3, 1980), pre-print 1713 (A-7), and U.S. Pat. No. 3,837,736).

In such microphone apparatus, it is impossible to harmonize the working angle of the microphone with the zooming magnification of the zoom lens, resulting in that reproduced sounds are not adequately matched with reproduced images. This imbalance between the working angle and the zooming magnification will be described below by way of illustrating a video camera having a zoom lens of ten magnification and a microphone having a variable directivity (from omnidirectional to second order pressure gradient unidirectional through unidirectional). The viewing angle of the zoom lens of ten magnification in the telescopic state is very narrow (about 4 degrees), while it is about 40 degrees in the wide viewing angle state. The working angle at half maximum of the variable-directivity microphone is 360 degrees in the omnidirectional state, 180 degrees in the unidirectional state, and 100 degrees in the second order pressure gradient unidirectional state (i.e., the telescopic state). Namely, the working angle of the variable-directivity microphone is very wide in comparison with the viewing angle of the zoom lens. When defining an acoustic zooming magnification of a microphone as the ratio of the distance factor in the wide viewing angle mode to that in the telescopic mode, the acoustic zooming magnification of the above-mentioned variable-directivity microphone is about 2.7, i.e., the acoustic zooming magnification of the microphone is very much smaller than the zooming magnification of the optical zoom lens. The distance factor means a distance from a sound source to a directional microphone which is positioned so as to produce noise and echo signals equivalent to those obtained in an omnidirectional microphone separated from a sound source by a unit distance. The distance factors of an omnidirectional microphone, a unidirectional microphone and a second order pressure-gradient microphone are 1, about 1.7 and about 2.7, respectively (see, for example, "An anthology of articles on microphones" from the pages of the Journal of the Audio Engineering Society vol 1-vol. 27 (1953–1979)", p.62). To eliminate the above-mentioned imbalance, the development of a superdirectional microphone having an extremely sharp directivity is essential. With the present technology, however, it is impossible to realize a microphone having such a directivity and the capability of being built into a video camera which must be compactly constructed.

A microphone apparatus which can produce acoustic zoom effects on the basis of two-channel stereo sound recording is known. An apparatus of this type is disclosed as a stereo sound processor for television broadcasting, in U.S. Pat. No. 4,594,610. This processor is designed to use two microphones to conduct a stereo recording. The two microphones are disposed on the right and left of a stage, separately from a video camera, to generate microphone signals L and R from which a sum signal (L+R) and a difference signal (L−R) are produced. In order to produce monophonic sounds in the telescopic mode and stereophonic sounds in the wide viewing mode, the mixing ratio of the sum signal (L+R) and the difference signal (L−R) is controlled in accordance with the control of the zoom lens of the video camera, so that the monophonic sum signal (L+R) is greater than the difference signal (L−R) in the telescopic mode, and, to the contrary, the difference signal (L−R) is greater than the monophonic sum signal (L+R) in the wide viewing angle mode. This apparatus can solve a problem in a two-channel stereo recording and reproducing system in which the sum signal (L+R) and the difference signal (L−R) are delivered without any processing, which problem is that, When images and sounds are recorded simultaneously by panning the video camera to the left and zooming in, the zoomed subject is displayed largely in the center on the television image, but the sound is delivered only from the left loudspeaker.

In such an apparatus, since the microphone is not installed on the video camera, the pan operation of the video camera is performed regardless of the direction of the principal axis of the directivity of the microphone. When the sound source is positioned in the panned direction, therefore no problem is caused. But, when the sound source is not in the panned direction, the displayed image and the reproduced sound fail to coincide with each other. Even if the apparatus is installed on the video camera and a microphone having any directivity is employed, as far as the processing is executed on the basis of the two signals L and R, it is difficult to simultaneously satisfy both the quality (such as the localization, spaciousness and perspective) of stereo sounds required in the wide viewing angle mode and the quality (such as clearness) of monophonic sounds required in the telescopic mode, resulting in that either quality must be ignored.

A conventional microphone apparatus, for example, disclosed in the above-mentioned three references is provided with a signal means for generating a signal corresponding to the zooming magnification of the zoom lens. This signal means comprises a potentiometer the resistance of which can be changed by sliding a contactor which is driven in accordance with the movement of the zoom lens, through a means mechanically interconnecting the contactor and the zoom lens.

A conventional microphone apparatus provided with such a signal means has a problem in that mechanical vibrations propagate through the casing or the space to the microphone to generate noise signals. Since the resistance of the potentiometer must be high in view of the power consumption, the level of the noise electromagnetically induced in the potentiometer is so high that the noise is mixed into the signals of the microphone. In the potentiometer, moreover, noises are generated when the contactor of the potentiometer is slid, to be mixed into the signals of the microphone. Besides, a potentiometer, which is a slide-type variable resistor, has problems in reliability and reproducibility, resulting in that a potentiometer is not suitable to be used as a part which is frequently operated.

SUMMARY OF THE INVENTION

The microphone apparatus of this invention, which overcomes the above-discussed and numerous other disadvantages and deficiencies of the prior art comprises a superdirectional sound pickup means for generating a directional sound pickup signal D; a stereo sound pickup means for generating stereo sound pickup signals L and R; a zoom position detection means for generating a zoom position signal which corresponds to the zoom position of said zoom lens; a first signal means for generating a first control signal Vc1 the value of which is changed according to said zoom position signal; a second signal means for generating a second control signal vc2 the value of which is changed according to said zoom position signal; a first amplifying means for ge ne rating a first amplified signal K1·D, said first amplified signal being a product of said superdirectional sound pickup signal D and a value K1 which corresponds to said first control signal Vc1; a second amplifying means for generating a second amplified signal K2·L, said second amplified signal being a product of one of said stereo sound pickup signals L and R and a value K2 which corresponds to said second control signal Vc2; a third amplifying means for generatIng a third amplified signal K2·R, said third amplified signal being a product of another of said stereo sound pickup signals L and R and a value K2 which corresponds to said second control signal Vc2; a first adding means for generating a first sum signal K1·D+K2·L which is the sum of said first amplified signal K1·D and said second amplified signal K2·L; and a second adding means for generating a second sum signal K1·D+K2·R which is the sum of said first amplified signal K1·K and said third amplified signal K2·R.

In a preferred embodiment, the zoom position detection means detects the zoom position of said zoom lens without making mechanical contact with said zoom lens.

In a preferred embodiment, the zoom position detection means further comprises: a plurality of reflector areas formed on the outer periphery of a zoom ring of said zoom lens, each of said reflector areas being composed of a row of one or more high reflection index portions and one or more low reflection index portions; a light emitting means for irradiating light on said reflector area; and a light receiving means for detecting light reflected from each reflector areas, said zoom position signal being a digital signal of two or more bits which is produced from binary signals representing the reflection index of said reflector areas.

In a preferred embodiment, the first and second signal means further comprise an analog multiplexer which selects one of channels in accordance with a digital signal, and each of said first and second control signals is a DC signal the level of which corresponds to said selected channel.

In a preferred embodiment, the first and second signal means further comprise: an analog multiplexer which selects one of channels in accordance with a digital signal; a reference voltage source connected to the common terminal of said analog multiplexer; resistors one end of each cf which is connected corresponding one of said channels of said analog multiplexer; and a reference resistor, one end of said reference resistor being connected to other end of each of said resistors, and the other end of said reference resistor being grounded.

In a preferred embodiment, at the wide viewing angle zoom position cf said zoom lens, the mixing ratio of said stereo sound pickup signals is set to 100%, and the mixing ratio of said superdirectional sound pickup signal is set to 0%, and, at the telescopic zoom position of said zoom lens, the mixing ratio of said stereo sound pickup signals is set to 0%, and the mixing ratio of said superdirectional sound pickup signal is set to 100%, said mixing ratios being varied within said ranges in proportion to the variation of the viewing angle of said zoom lens.

In a preferred embodiment, the first and second sum signals are varied in proportion to a power of a zooming magnification of said zoom lens.

In a preferred embodiment, the first and second sum signals are varied in proportion to a power ranging 0.3 to 0.5 of a zooming magnification of said zoom lens.

In a preferred embodiment, at the wide viewing angle zoom position of said zoom lens, the mixing ratio of said stereo sound pickup signals and is set to 100%, and the mixing ratio of said superdirectional sound pickup signal is set to 0%, and at the telescopic zoom position of said zoom lens, the mixing ratio of said superdirectional sound pickup signal is set to be larger than the mixing ratios of said stereo sound pickup signals, said mixing ratios being varied within said ranges in proportion to the variation of the viewing angle of said zoom lens.

In a preferred embodiment, the zoom position detection means further comprises: two reflector areas formed on the outer periphery of a zoom ring of said zoom lens, each of said reflector areas being formed by a material of a high reflection index material and having a triangle shape which elongates along the rotation direction of said zooming ring; a light emitting means for irradiating light on said reflector areas; and a light receiving means for detecting light reflected from each reflector areas, and said first and second control signals are analog signals.

The microphone apparatus for video camera having a zoom lens, comprises: a superdirectional sound pickup means for generating a directional sound pickup signal D; a stereo sound pickup means for generating stereo sound pickup signals I and R; a zoom position detection means for generating first and second analog control signals Vc1 and Vc2 the level of each of which is changed according to the zoom position of said zoom lens; a first amplifying means for generating a first amplified signal K1·D, said first amplified signal being a product of said superdirectional sound pickup signal D and a value K1 which corresponds to said first control signal vc1; a second amplifying means for generating a second amplified signal K2·L, said second amplified signal being a product of one of said stereo sound pickup signals L and R and a value K2 which corresponds to said second control signal Vc2; a third amplifying means for generating a third amplified signal K2·R, said third amplified signal being a product of another of said stereo sound pickup signals L and R and a value K2 which corresponds to said second control signal Vc2; a first adding means for generating a first sum signal K1·D+K2·L which is the sum of said first amplified signal K1·D and said second amplified signal K2·L; and a second adding means for generating a second sum signal K1·D+K2·R which is the sum of said first amplified signal K1·K and said third amplified signal K2·R.

In a preferred embodiment, the zoom position detection means further comprises: two reflector areas formed on the outer periphery of a zoom ring of said zoom lens, each of said reflector areas being formed by a material of a high reflection index material and having a shape of a triangle, said two triangles being elongated in a reversed parallel manner along the rotation direction of said zoom ring; a light emitting means for irradiating light on said reflector areas; and a light receiving means for detecting light reflected from each reflector areas.

The microphone apparatus for a video camera having a zoom lens, comprises: a first unidirectional microphone the principal axis of which is directed to the front of said apparatus; a second unidirectional microphone the principal axis of which is directed to the front of said apparatus, said second unidirectional microphone being disposed behind said first unidirectional microphone and separated therefrom by a predetermined distance; a bidirectional microphone the principal axis of which is perpendicular to the direction of the principal axis of said first unidirectional microphone, said bidirectional microphone being disposed between said first and second unidirectional microphone s and closer to said second unidirectional microphone; a first amplifying means for amplifying the output of said first unidirectional microphone; a phase shifter for generating a first unidirectional sound pickup signal M2 which is obtained by phase-shifting the output of said first amplifying means; a second amplifying means for amplifying the output of said bidirectional microphone to generate a bidirectional sound pickup signal S; a third amplifying means for amplifying the output of said second unidirectional microphone to generate a second unidirectional sound pickup signal M1; a zoom position detection means for generating a zoom position signal which corresponds to the zoom position of said zoom lens; a first signal means for generating a first control signal Vc1 the value of which is changed according to said zoom position signal; a second signal means for generating a second control signal vc2 the value of which is changed according to said zoom position signal; a fourth amplifying means for generating a first amplified signal K1·M2, said first amplified signal being a product of said superdirectional sound pickup signal M2 and a value K1 which corresponds to said first control signal vc1; a fifth amplifying means for generating a second amplified signal K2·S, said second amplified signal being a product of said bidirectional sound pickup signal S and a value K2 which corresponds to said second control signal Vc2; a first adding means for generating a first sum signal M1+K1·M2+K2·S which is the sum of said second unidirectional sound pickup signal M1, said first amplified signal K1·M2 and said second amplified signal K2·S; and a second adding means for generating a second sum signal M1+K1·M2+K2·S which is obtained by subtracting said second amplified signal K2·S from the sum of said second unidirectional sound pickup signal M1 and said first amplified signal K1·M2.

In a preferred embodiment, the zoom position detection means detects the zoom position of said zoom lens without making mechanical contact with said zoom lens.

The video camera of this invention comprises: a zoom lens the focal length of which can be changed in accordance with the rotation of a zoom ring; a microphone apparatus; a photoelectric converter for converting optical images formed by said zoom lens into electric signals; and a image signal means for generating image signals from said electric signals, said microphone apparatus comprising: a superdirectional sound pickup means for generating a irectional sound pickup signal D: a stereo sound pickup means for generating stereo sound pickup signals L and R; a zoom position detection means for generating a zoom position signal which corresponds to the zoom position of said zoom lens; a first signal means for generating a first control signal Vc1 the value of which is changed according to said zoom position signal; a second signal means for generating a second control signal Vc2 the value of which is changed according to said zoom position signal; a first amplifying means for generating a first amplified signal K1·D, said first amplified signal being a product of said superdirectional sound pickup signal D and a value K1 Which corresponds to said first control signal vc1; a second amplifying means for generating a second amplified signal K2·L, said second amplified signal being a product of one of said stereo sound pickup signals L and R and a value K2 which corresponds to said second control signal Vc2; a third amplifying means for generating a third amplified signal K2·R, said third amplified signal being a product of another of said stereo sound pickup signals L and R and a value K2 which corresponds to said second control signal vc2; a first adding means for generating a first sum signal K1·D+K2·L which is the sum of said first amplified signal K1·K and said second amplified signal K2·L; and a second adding means for generating a second sum signal K1·D+K2·R which is the sum of said first amplified signal K1·D and said third amplified signal K2·R.

Thus, the invention described here in makes possible the objectives of:

(1) to provide a microphone apparatus for a video camera which can record sounds adequately matched with images;

(2) to provide a microphone apparatus for a video camera which can record sounds with excellent acoustic zooming effects;

(3) to provide a microphone apparatus for a video camera in which noise due to the operation of the zoom lens can be prevented from being generated;

(4) to provide a microphone apparatus for a video camera which is excellent in reliability;

(5) to provide a video camera which can record sounds adequately matched with images;

(6) to provide a video camera which can record sounds with excellent acoustic zooming effects;

(7) to provide a video camera in which noise due to the operation of the zoom lens can be prevented from being generated;

(8) to provide a video camera which is excellent in reliability.

BRIEF DESCRIPTION OF THE DRAWINGS

This invention may be better understood and its numerous objects and advantages will become apparent to those skilled in the art by reference to the accompanying drawings as follows:

FIG. 11a is a block diagram of another microphone apparatus according to the invention.

FIG. 11b shows a reflector pattern formed on the zoom ring of the zoom lens in the apparatus of FIG. 11a.

FIG. 11c is a diagram illustrating the zoom position detection means of the apparatus of FIG. 11a.

DESCRIPTION OF THE PREFERRED EMBODIMENTS

Figure 1:
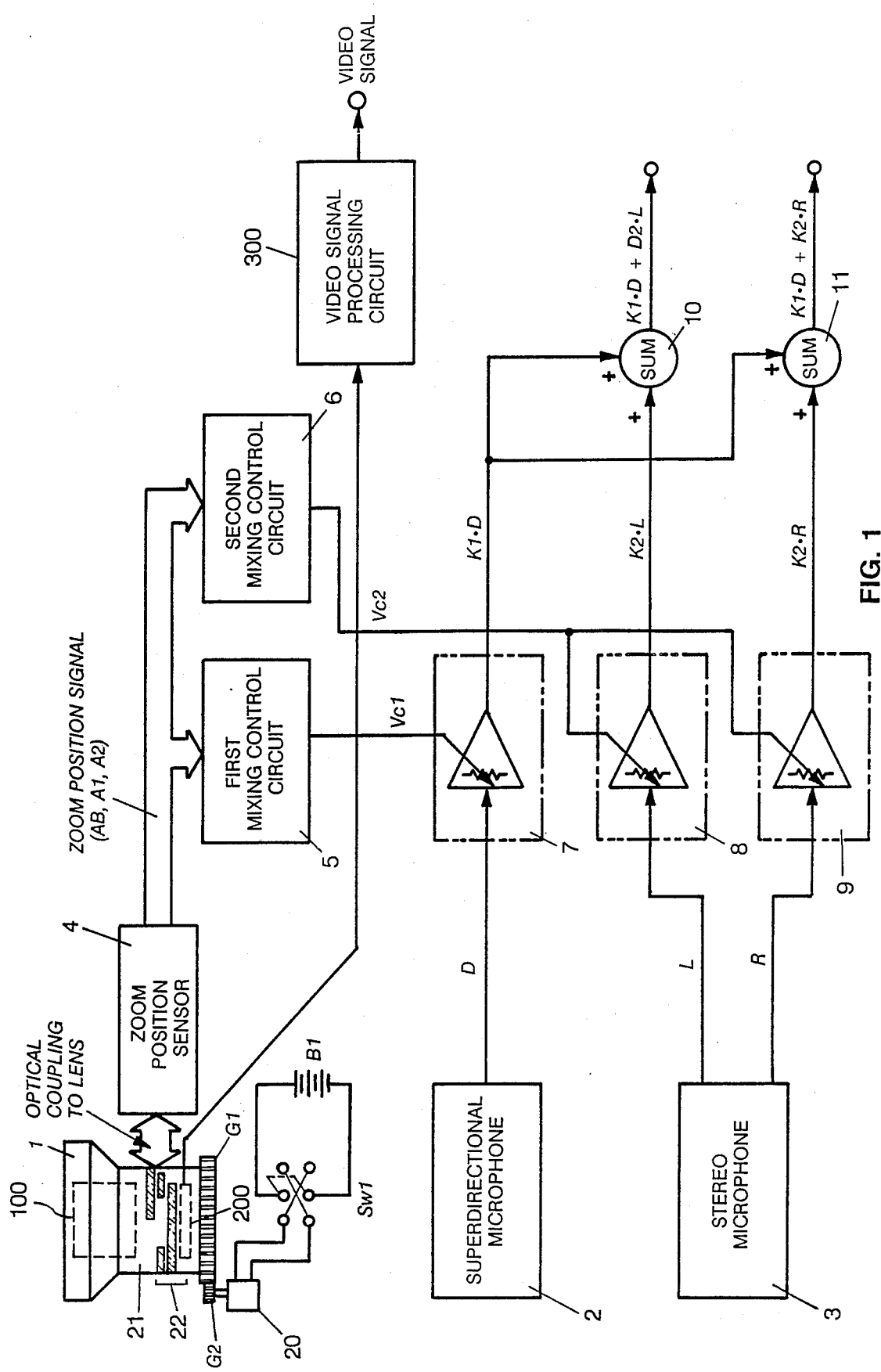
FIG. 1 is a block diagram of a microphone apparatus according to the invention.

FIG. 1 is a block diagram of a microphone apparatus for a video camera according to the invention. The microphone apparatus of FIG. 1 comprises an optical zoom lens 1, a superdirectional sound pickup means 2 a stereo sound pickup means 3, a zoom position sensor 4, first and second mixing control circuits 5 and 6, and first to third amplifiers 7-9.

The zoom lens 1 incorporates a lens optical system 100 for focusing the light from an object, and a photoelectric converting device 200 for converting the image of the object formed by the lens optical system 100 into electric signals. The lens optical system 100 is a conventional optical system composed of plural fixed and movable lens elements. A typical example of the photoelectric converting devices 200 is a charge coupled device (CCD). The output signals of the photoelectric converting device 200 are supplied to a video signal processing circuit 300 and processed therein in a usual manner to be converted into image signals such as composite television signals, RGB signals, and two-channel component signals composed of luminance signals and color signals.

The superdirectional sound pickup means or microphone 2 and the stereo sound pickup means or microphone 3 are disposed so that their front faces are directed along the center line of the viewing angle of the zoom lens 1. The superdirectional microphone 2 picks up the sound field existing in a narrow range in its frontal direction, and produces a monaural superdirectional sound pickup signal D. The stereo microphone 3 picks up the sound field existing in a wide range in its frontal direction, and generates stereo sound pickup signals L and R.

Figure 7:
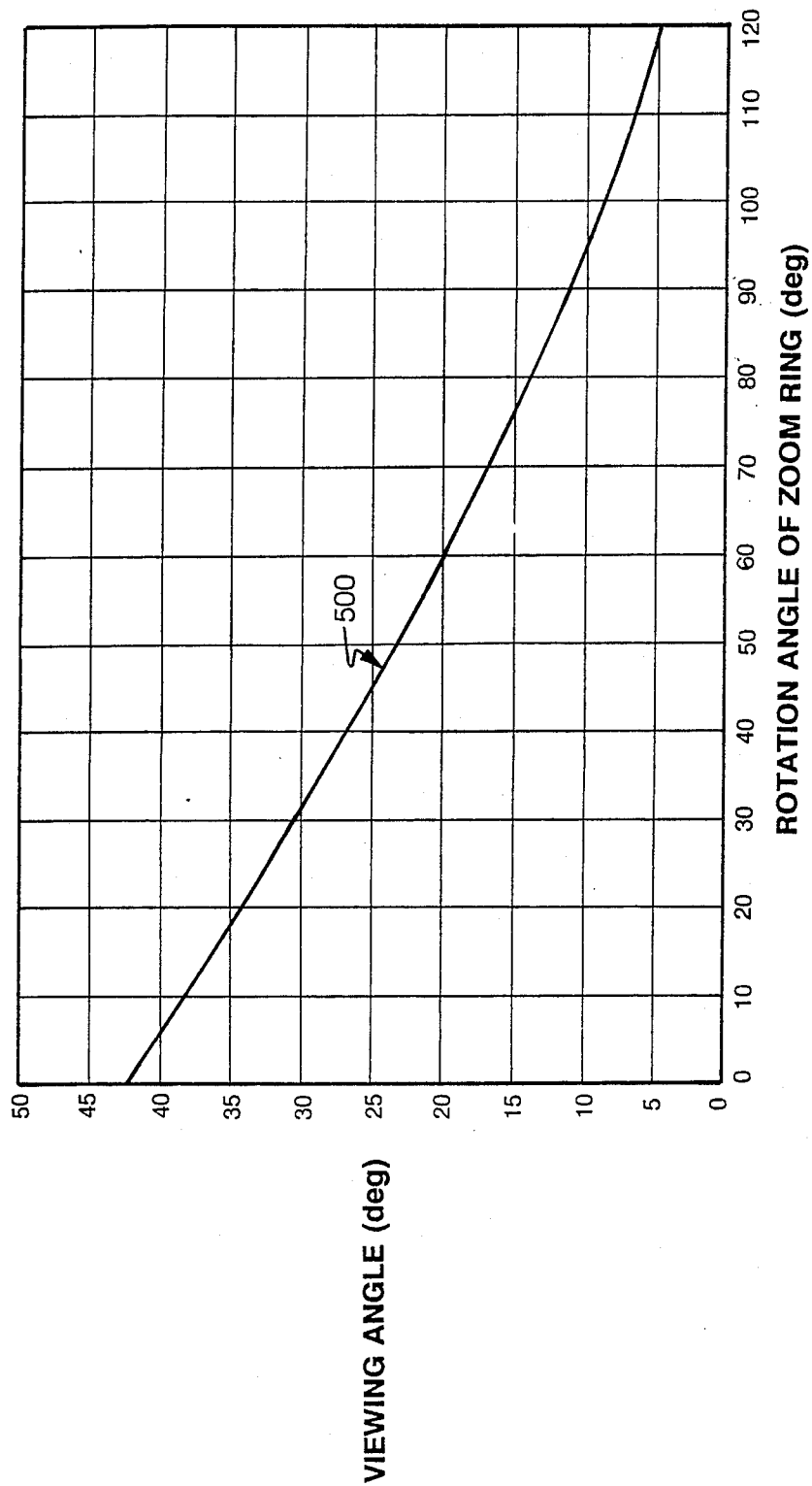
FIG. 7 is a graph showing the relation between the viewing angle of the zoom lens and the rotation angle of the zoom ring.

The zoom lens 1 is provided with a zoom ring 21 which can be rotated to vary the focal length of the zoom lens 1. The focal length corresponds, as shown in FIG. 7, uniquely to the rotation angle of the zoom ring 21. Namely, when rotating the zoom ring 21 in one direction, the viewing angle varies from the wide viewing angle to the telescopic, or, to the contrary, when rotating the zoom ring 21 in the reverse direction, the viewing angle changes from the telescopic to the wide viewing angle. The zoom ring 21 can be rotated not only by a manual operation but also by a motor-driven operation. A gear G1 formed at one end of the zoom ring 21 is meshed with a gear G2 mounted on the shaft of a driving motor 20 so that the rotation of the driving motor 20 energized by a power source B1 is transmitted to the zoom ring 21 through the gears G1 and G2. The modes of zoom-in and zoom-out are changed over by switching over the rotation direction of the driving motor 20 by a switch SW1.

Figure 2B:
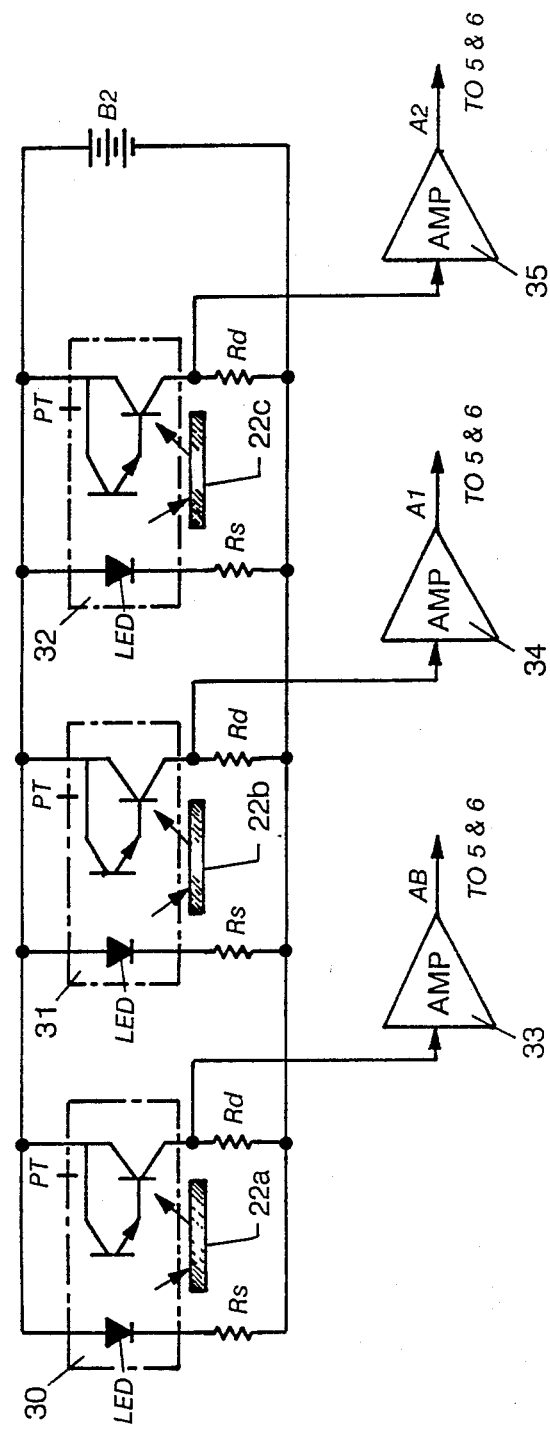
FIG. 2b is a circuit diagram of the zooming magnification detection means.
Figure 2A:
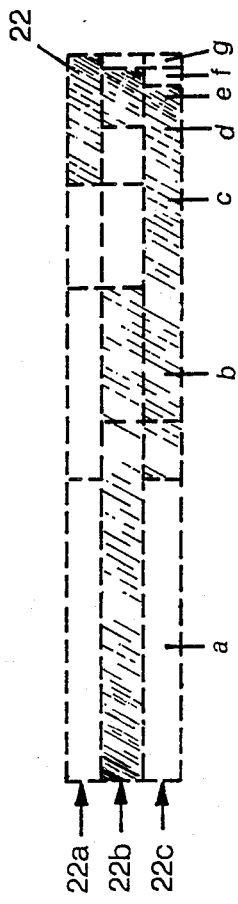
FIG. 2a shows a reflector pattern formed on the zoom ring of the zoom lens in the apparatus of FIG. 1.

The circumferential surface of the zoom ring 21 is formed by a black material of a low reflection index. A reflector 22 patterned as shown in FIG. 2a has an elongated rectangular shape and is formed on the surface of the zoom ring 21. The zoom position sensor 4 comprises three reflection type photosensors which, as shown in FIG. 2b, are arranged so as to face the reflector 22, and detect the rotation angle of the zoom ring 21 to deliver a 3-bit digital zoom position signal (A0, A1, A2).

Figure 3:
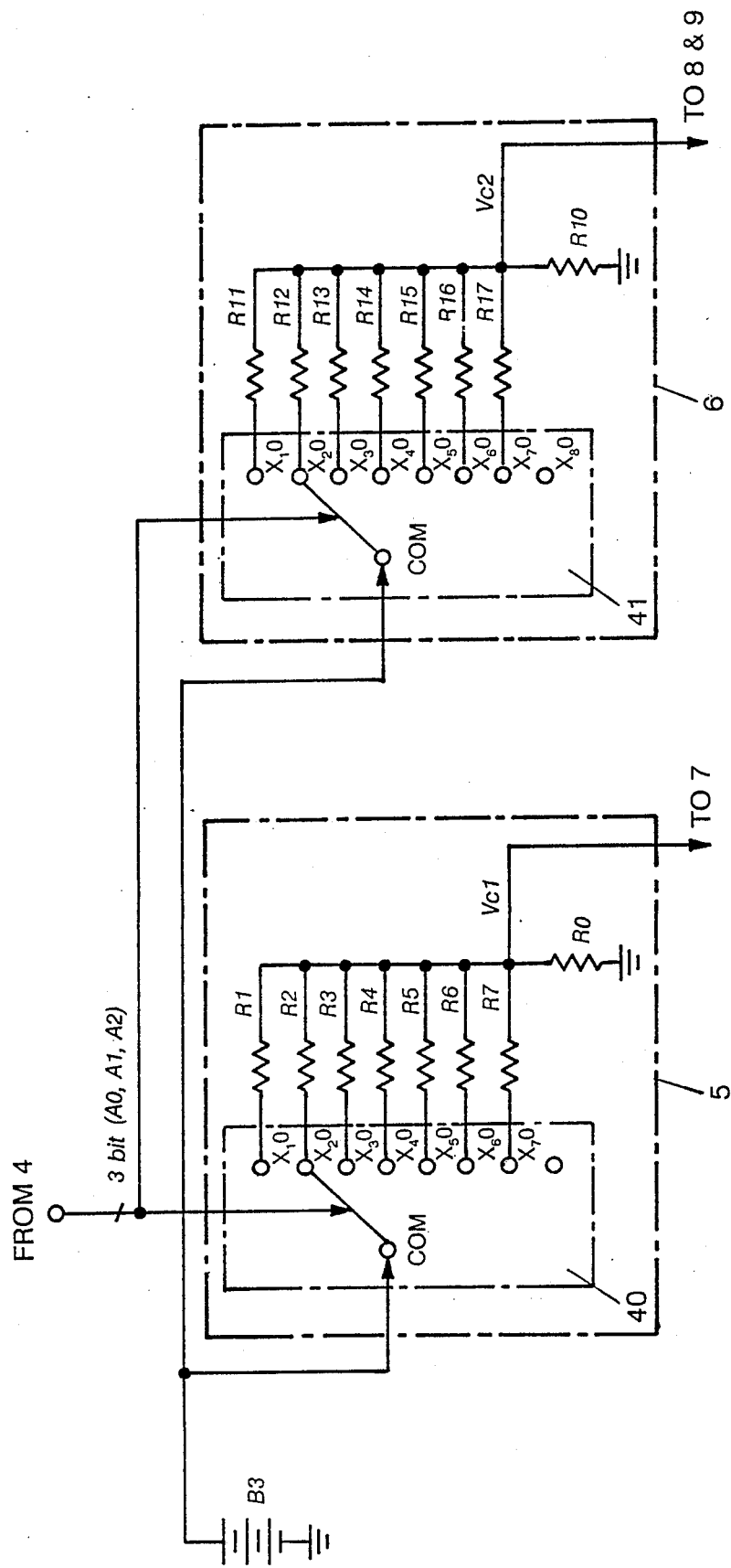
FIG. 3 is a circuit diagram illustrating the first and second signal means.

The first mixing control circuit 5 is connected to the zoom position sensor 4, and receives the zoom position signal (A0, A1, A2) to produce a first control signal Vc1 of a DC voltage the level of which corresponds to the zoom position signal (A0, A1, A2) (FIG. 3). Similarly, the second mixing control circuit 6 is connected to the zoom position sensor 4, and receives the zoom position signal (A0, A1, A2) to produce a second control signal Vc2 of a DC voltage the level of which corresponds to the zoom position signal (A0, A1, A2).

Figure 4:
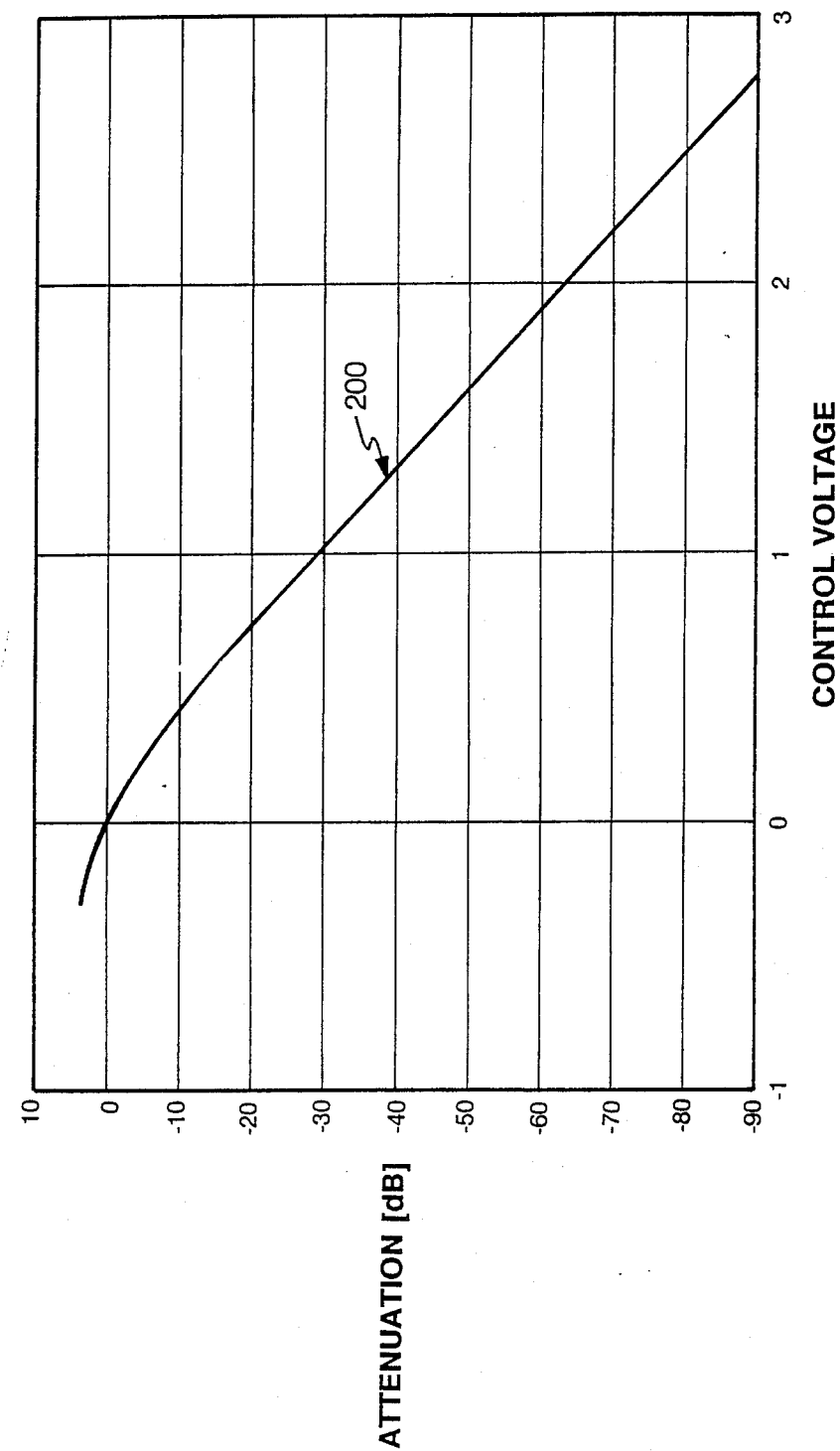
FIG. 4 is a graph showing the relation between the control voltage and the attenuation in the first, second and third amplifying means.

The first voltage control amplifier 7 has an attenuation-control voltage characteristic shown in FIG. 4. The amplifier 7 is connected to the superdirectional microphone 2 and the first mixing control circuit 5 to receive the superdirectional sound pickup signal D and the first control signal Vc1. The amplifier 7, by using the first control signal Vc1 as a control signal, multiplies the magnitude of the superdirectional sound pickup signal D by K1, and outputs the product (k1·D). Likewise, the second voltage control amplifier 8 is connected to the stereo microphone 3 and the second mixing control circuit 6 to receive the stereo sound pickup signal L and the second control signal Vc2. The second amplifier 8 by using the second control signal Vc2 as a control signal, multiplies the magnitude of the stereo sound pickup signal L by K2, and outputs the product (K2·L). The third voltage control amplifier 9 is linked to the stereo microphone 3 and the second mixing control circuit 6, and receives the stereo sound pickup signal R and the second control signal Vc2. The third voltage control amplifier 9, by using the second control signal Vc2 as a control signal, multiplies the magnitude of the stereo sound pickup signal R by K2, and outputs the product (K2·R).

The output signal (K1·D) of the first amplifier 7 and the output signal (K2·L) of the second amplifier 8 are supplied to a first adder 10, and the output signal (K1·D) of the first amplifier 7 and the output signal (K2·R) of the third amplifier 9 are supplied to a second adder 11. The first adder 10 adds the output signal (K1·K) and the output signal (K2·L) to produce a first sum signal (K1·D+K2·L). The second adder 11 adds the output signal (K1·K) and the output signal (K2·R) to produce a second sum signal (K1·D+K2·R).

The construction and operation of the microphone apparatus of FIG. 1 will be described in more details.

FIG. 2a shows the pattern of the reflector 22. The reflector 22 comprises a first reflector area 22a, a second reflector area 22b and a third reflector area 22c. In each of the reflector areas, one or more portions of a high reflection index (black regions in FIG. 2a) and one or more portions of a low reflection index (white regions in FIG. 2a) are arranged along the rotation direction of the zoom ring 21. The lateral direction in the drawing corresponds to the rotation direction of the zoom ring 21. The left end corresponds to the wide viewing angle zoom position, and the right end to the telescopic zoom position. The high reflective portions consist of aluminum, and the untreated surface of the zoom ring 21 constitutes the low reflective portions. The three reflector areas 22a-22c which consist of high reflective and low reflective portions are arranged as shown in FIG. 2a, so that 3-bit (i.e., 8-stage) digital data on the rotation angle of the zoom ring 21 can be obtained. In this embodiment, the reflector 22 is patterned so that seven separate data a to g on the rotation angle of the zoom ring 21 can be obtained in sequence along the direction from the wide viewing angle side to the telescopic side. It is obvious for those skilled in the art that, when the reflector 22 is patterned so as to produce signals of a larger number of bits, more detailed information about the rotation angle of the zoom ring 21 can be obtained, thereby enabling the microphone apparatus to be controlled more precisely.

FIG. 2b shows the relation between the zoom; position sensor 4 and the reflector areas 22a-22c. Reflection type photosensors 30, 31, 32 each of which is provided with a light emitting diode LED and a phototransistor PT are disposed to face the reflector areas 22a, 22b, and 22c, respectively. Each light emitting diode LED is connected to a load resistor Rs, and driven by a power source B2 to emit light the amount of which corresponds to the level of a forward current. Each phototransistor PT is connected to a load resistor Rd, and driven by the power source B2 to generate a current the level of which corresponds to the amount of light incident thereon, resulting in that a voltage appears across the load resistor Rd. In the photosensor 30, the light emitting diode LED constantly emits light the amount of which corresponds to the forward current level, toward the reflector area 22a, and the phototransistor PT detects the reflected light from the reflector area 22a, and converts the detected light into electric signals which are then supplied to an amplifier 33. Since the amount of the reflected light from the reflector area 22a varies in accordance with the pattern facing the photosensor 30, the output of the phototransistor PT is a binary signal the value of which varies corresponding to the rotation angle of the zoom ring 21. The amplifier 33 amplifies the signal to produce a zoom position signal A0. In the same way, the photosensors 31 and 32 respectively generate electric signals corresponding to the pattern of the reflector areas 22b and 22c. Amplifiers 34 and 35 amplify the signals from the photosensors 31 and 32 to produce zoom position signals A1 and A2. The signals A0, A1 and A2 constitute a 3-bit zoom position signal (A0, A1, A2) which rePresents the rotation angle of the zoom ring 21 and is supplied to the first and second mixing control circuits 5 and 6. In this embodiment, the zoom position sensor 4 is designed so as to constantly detect the zoom position. Alternatively, the sensor 4 may be de signed so as to detect the zoom position intermittently.

FIG. 3 illustrates the first and second mixing control circuits 5 and 6. The first mixing control circuit 5 supplies a first control voltage Vc1 to the first voltage control amplifier 7 which controls the mixing level of the superdirectional sound pickup signal D. The second mixing control circuit 6 supplies a second control voltage Vc2 to the second and third voltage control amplifiers 8 and 9 which control the mixing levels of the stereo sound pickup signals L and R. A multiplexer 40 of the first mixing control circuit 5 and a multiplexer 41 of the second mixing control circuit 6 can control an eight-channel analog switch in accordance with 3-bit digital signals.

In the first mixing control circuit 5, a common terminal COM of the multiplexer 40 is connected to a DC power source from which a predetermined voltage B3 is supplied. To terminals X1-X7 of the multiplexer 40, resistors R1-R7 are connected respectively. The other ends of the resistances R1-R7 are bundled together and connected to a resistor R0 the other end of which is grounded. The multiplexer 40 receives the 3-bit zoom position signal (A0, A1, A2) from the zoom position sensor 4, and selects one of the terminals X1-X7 in accordance with the value of the zoom position signal. The multiplexer 40 is designed so as to select the terminal X1 when receiving the zoom position signal (A0, A1, A2) corresponding to the zoom position a of the reflector 22, and to select one of the terminals X2-X7 when receiving the zoom position signal (AQ, A1, A2) corresponding to one of the zoom positions b-g. FIG. 3 shows the state where the common terminal COM is connected to the terminal X2 corresponding to the zoom position b. In this state, the level of the first control signal Vc1 is given by $\{B3 \cdot R2/(R2+R0)\}$ where R2 and R0 are resistance values of the resistor R0 and R2, respectively. In this way, one of the resistors R1-R7 is selected in response to the detected one of the zoom positions a-g so that the level of the first control signal Vc1 can be selected. Therefore it is possible to freely set the mixing level of the superdirectional sound pickup signal D.

In the second mixing control circuit 6, similarly, the common terminal COM of the multiplexer 41 is connected to the same DC power source which supplies the predetermine d DC voltage B3. To terminals X1-X7, resistors R-RI7 are connected respectively. The other ends of the resistors R11-R17 are bundle d together and connected to a resistor R10 the other end of which is grounded. The multiplexer 41 is designed so as to select one of the terminals X1-X7 when receiving the zoom position signal (A0, A1, A2) corresponding to one of the zoom positions a-g. The second control signal Vc2 at each zoom positions, which will be supplied to the second and third voltage control amplifiers 8 and 9, is given by the division of the voltage B3 through a combination of the resistor R10 and one of the resistors R11–R17, so that the level of the second control signal Vc2 can be selected. Therefore, it is also possible to freely set the mixing level of the stereo sound pickup signals L and R.

FIG. 4 illustrates the relation between the control voltage and the attenuation in the first, second and third voltage control amplifiers 7, 8 and 9. A voltage control amplifier has a control terminal for controlling the amplification factor, and the amplification factor is controlled by applying a DC voltage to the control terminal. In FIG. 4, a curve 200 indicates the attenuation-control voltage characteristic of the amplifiers 7, 8 and 9. The axis of abscissas indicates the control voltage in the unit of volts. The axis of ordinates denotes the attenuation expressed in decibels. In these voltage control type amplifiers, when the control voltage is 0 V, the attenuation is 0 dB. The attenuation is increased with the increase of the control voltage, and the attenuation of 80 dB can be achieved at the control voltage of about 2.5 V. The gradient of the curve 200 in the straight line region is about $-34$ dB/V. The amplifiers 7, 8 and 9 having such characteristics can control the mixing ratio of the superdirectional sound pickup signal D and the stereo sound pickup signals L and R, in accordance with the control signals Vc1 and Vc2, which are DC voltages.

Figure 5:
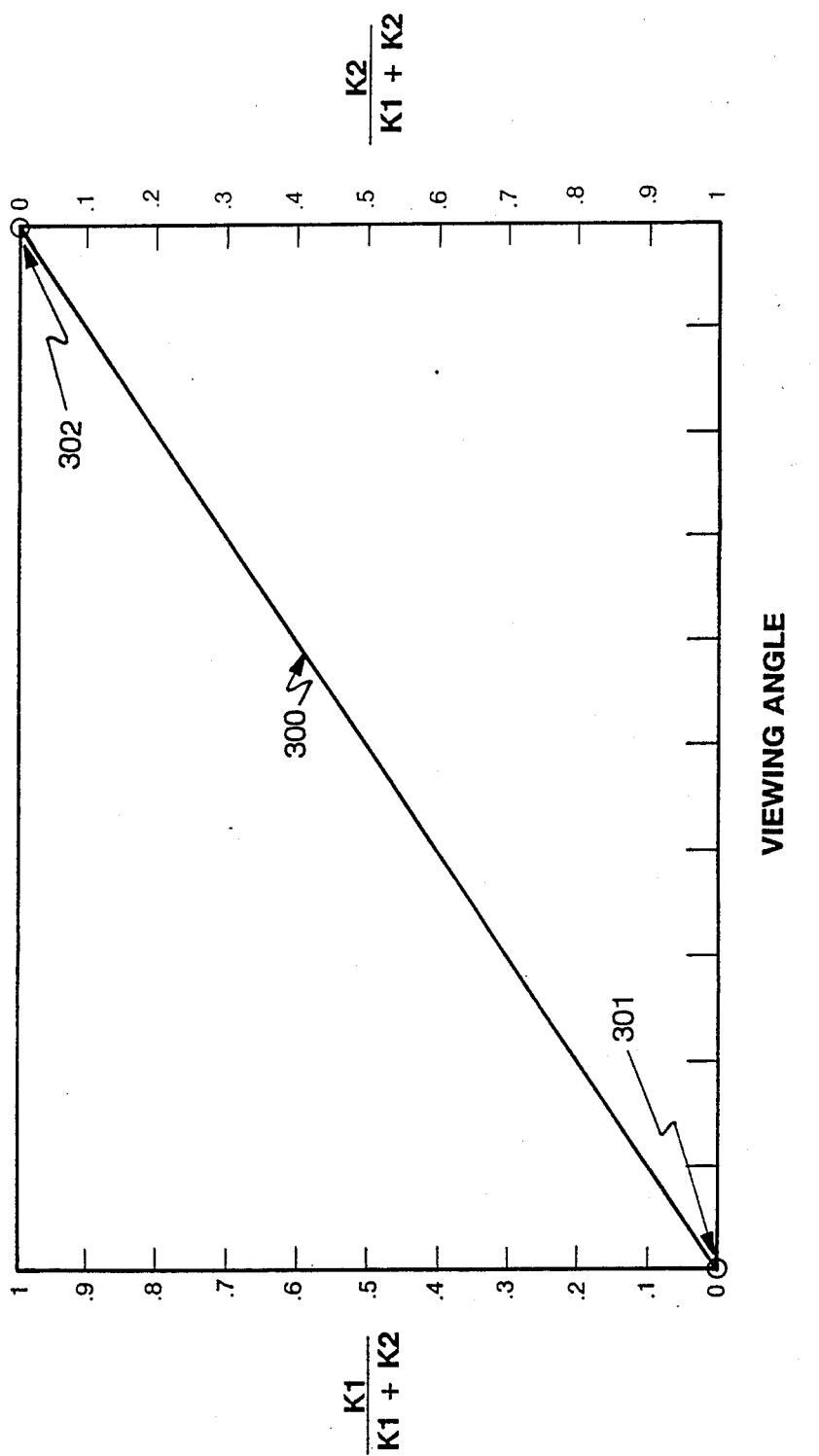
FIG. 5 is a graph showing a preferable relation between a viewing angle of the zoom lens and the mixing ratio of the superdirectional sound pickup signal to the stereo sound pickup signal.

FIG. 5 shows a preferable example of the mixing ratio between the superdirectional sound pickup signal D and the stereo sound pickup signals L and R with regard to the current viewing angle of the zoom lens 1. In FIG. 5, a curve 300 represents the mixing ratio-viewing angle relation, and the axis of abscissas denotes the viewing angle of the zoom lens 1. The left ordinate indicate s the mixing ratio $\{K1/(K1+K2)\}$ of the superdirectional sound pickup signal D, and the right ordinates indicates the mixing ratio $\{K2/(K1+K2)\}$ of the stereo sound pickup signals L and R. At the wide viewing angle zoom position 302, the mixing ratio of the stereo sound pickup signals L and R is 100%, and, at the telescopic zoom position 302, the mixing ratio of the superdirectional sound pickup signal D is 100%. The mixing ratios of the signals are varied from 0% to 100% in proportion to the variation in the viewing angle.

In this embodiment, the resistances of the resistors R1–R7 and R–R17 of the first and second mixing control circuits 5 and 6 can be determined in the following manner: (1) the mixing ratio of the superdirectional sound pickup signal D to the signals R and L is selected from the mixing ratio-viewing angle curve 300 (FIG. 5); (2) the control voltages Vc1 and Vc2 of the first, second and third voltage control amplifiers 7, 8 and 9 are determined from the attenuation-control voltage curve 200 (FIG. 4) so that they correspond to the selected mixing ratio; and (3) the resistances of the resistors R1–R7 and R11–R17 are set so that the control voltages Vc1 and Vc2 can be obtained at the zoom positions a–g. Consequently, the microphone apparatus can realize, in the wide viewing angle mode, the spaciousness, perspective localization, mobility, separation from background noises and others, which are the features of the stereo sound reproduction, and, in the telescopic mode, record clearly the sound from the object sound source. Therefore, the microphone apparatus can achieve acoustic zoom effects which match well with the images and have psychoacoustical effects.

Figure 6:
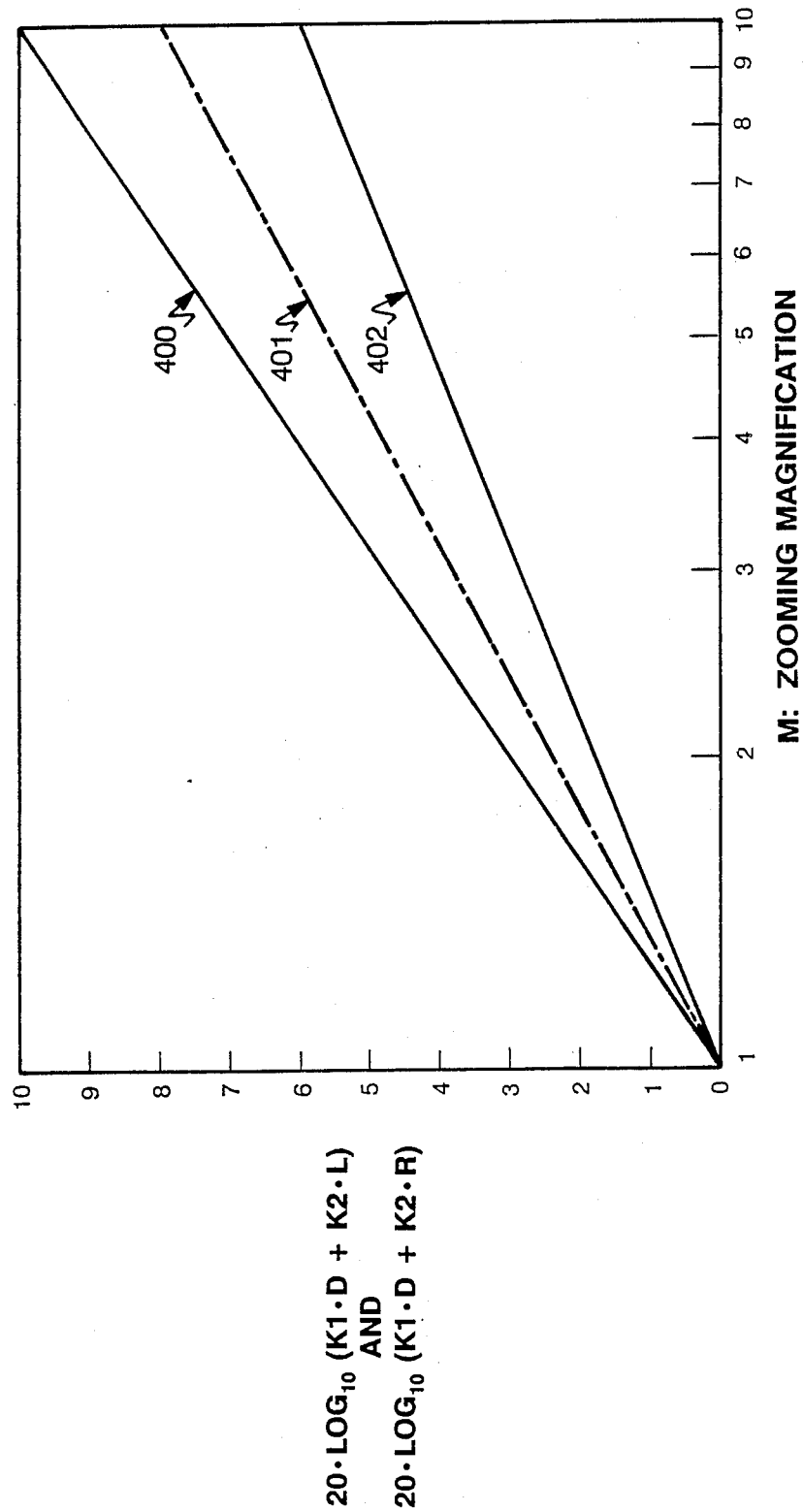
FIG. 6 is a graph showing preferable relations between a zooming magnification of the zoom lens and the magnitudes of the sum signals supplied from the first and second adding means.

FIG. 6 shows a preferable example of the relation between the current zooming magnification M of the zoom lens 1 and the magnitudes of sum signals (K1·D+K2·L) and (K1·K+K2·R) delivered from the first and second adders 10 and 11. The axis of abscissas indicates zooming magnification M in logarithmic form. The axis of ordinates expresses the magnitudes of the sum signals (K1·D+K2·L) and (K1·D+K2·R) in the unit of decibels, which are relative values against the values corresponding to the zooming magnification M of one (M=1). A curve 400 is an output level-zooming magnification relation curve obtained by varying the magnitudes of the sum signals in proportion to the 0.5th power of the current zooming magnification M. Curves 401 and 402 show similar relations obtained in the 0.4th power and 0.3th power of the magnification M, respectively. According to our experiments in psychoacoustic properties, by controlling the output level in accordance with the curve 400 when zooming-in and in accordance with the curve 402 when zooming-out, sound volumes matching with the variation of the image size can be obtained, and the acoustic zoom effects can be greatly improved. The output level is controlled by the first and second mixing control circuits 5 and 6 shown in FIG. 3. As apparent from the configuration of the first and second mixing control circuits 5 and 6, the output level and the mixing ratio can be set independently.

Figure 8:
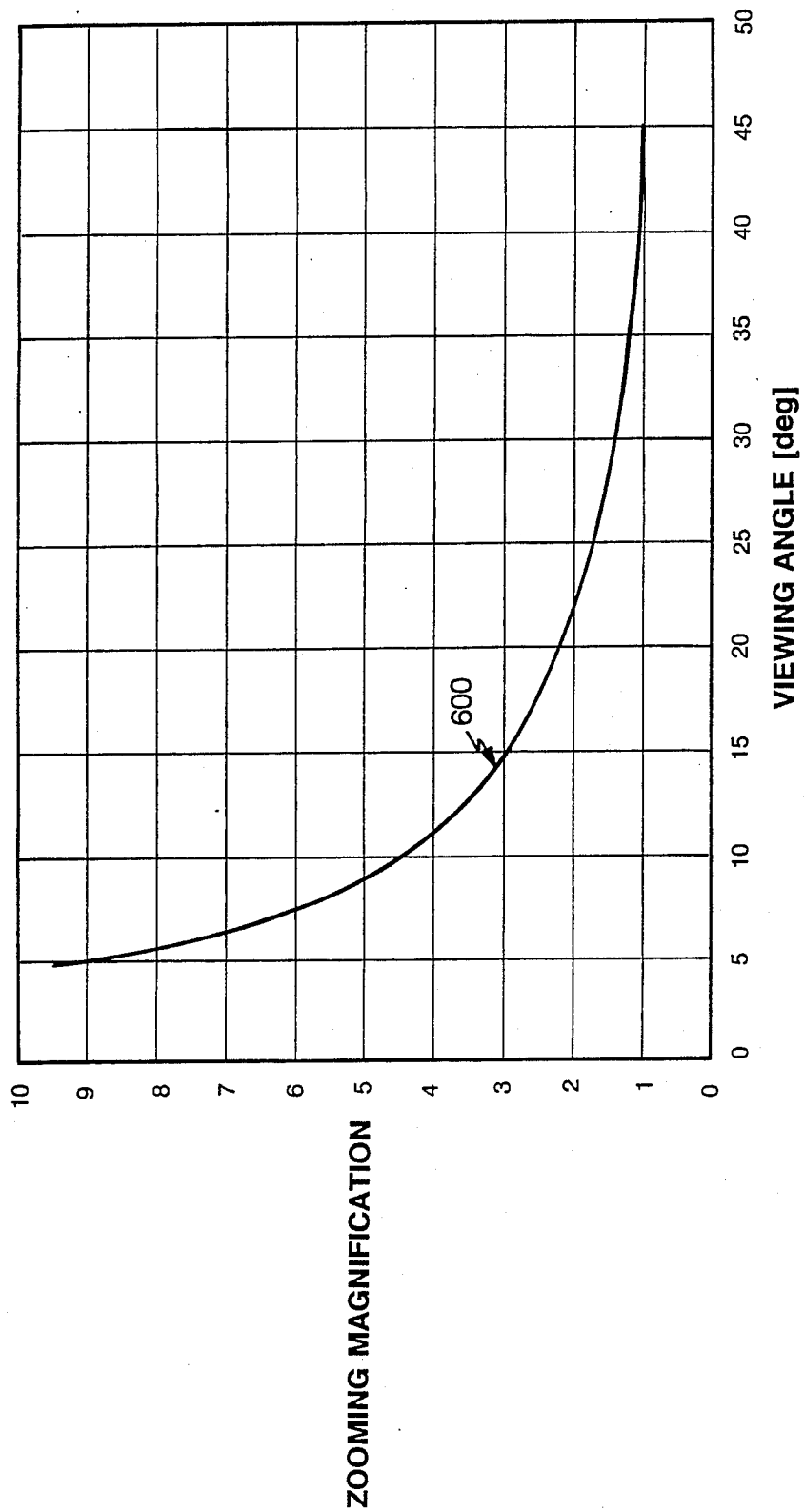
FIG. 8 is a graph showing the relation between the viewing angle and the zooming magnification of the zoom lens.

FIG. 7 shows the relation between the viewing angle and the rotation angle of the zoom ring 21 of the zoom lens I. A curve 500 is a viewing angle-rotation angle curve. FIG. 8 illustrates the relation between the zooming magnification M and the viewing angle of the zoom lens 1. A curve 600 shown in FIG. 8 is a zooming magnification-viewing angle curve. As mentioned above, the zoom lens 1 has a zooming magnification of ten times at maximum, and hence the viewing angle is about 4.2 degrees in the wide viewing angle mode and is about 42 degrees in the telescopic mode.

Figure 9:
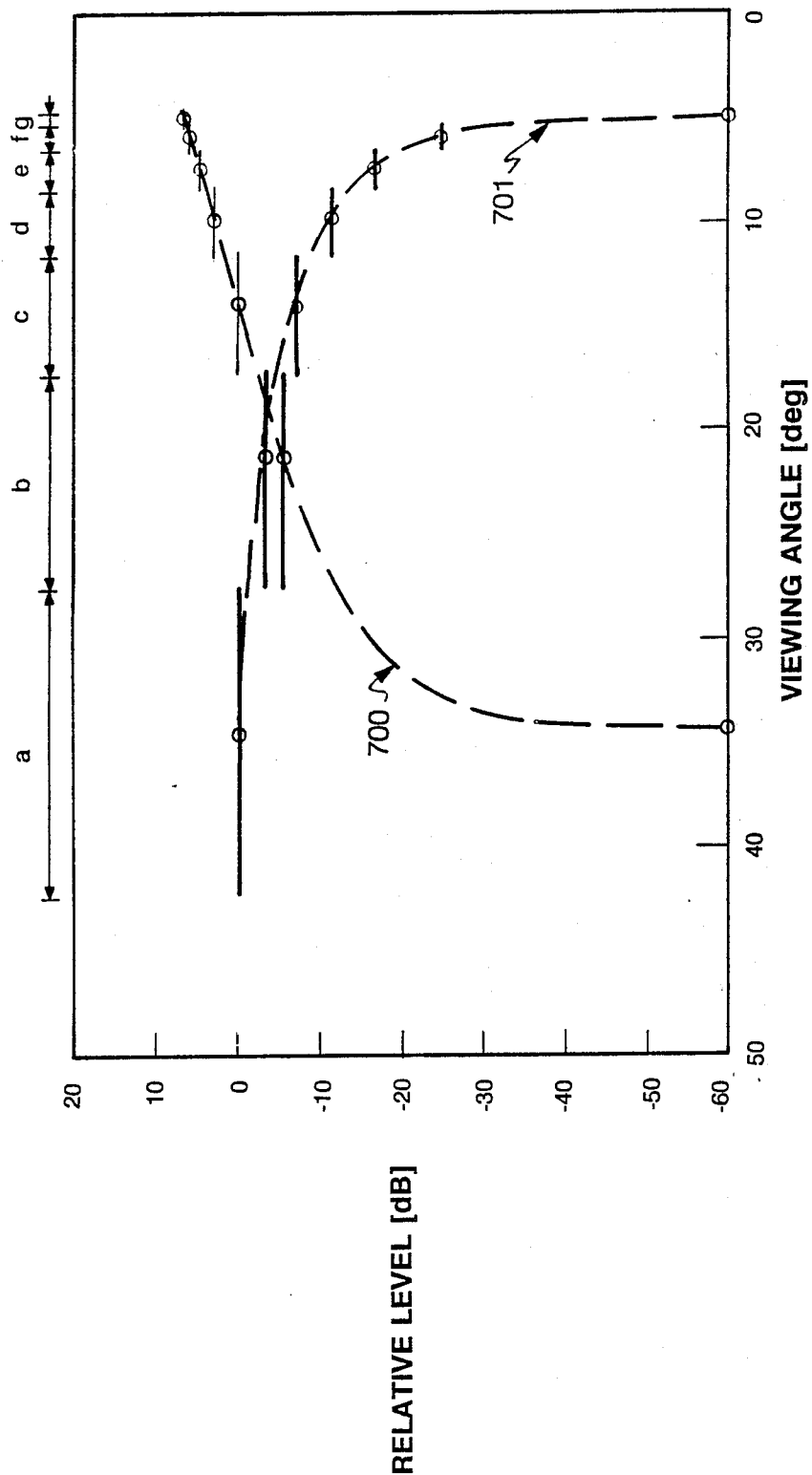
FIG. 9 is a diagram showing the relation between the viewing angle and the mixing levels of the the superdirectional sound pickup signal and stereo sound pickup signal, when the zoom lens having the properties shown in FIGS. 7 and 8 and the mixing is conducted under the relations shown in FIGS. 5 and 6.

FIG. 9 is a diagram showing the mixing level of the superdirectional microphone signal D and the stereo microphone signals L and R, at the zoom positions a–g of the zoom lens 1. In this case, the zoom lens has characteristics shown in FIGS. 7 and 8, the mixing of the superdirectional sound pickup signal D and the stereo sound pickup signals L and R is set so as to satisfy the relations shown by the mixing ratio-viewing angle curve 300 (FIG. 5) and by the output level-zooming magnification curve 401 (FIG. 6). A curve 700 is a reference curve for setting the mixing level of the superdirectional sound pickup signal D, and a curve 701 is a reference curve for setting the mixing level of the stereo sound pickup signals L and R. In FIG. 9, fine lines extending laterally denote mixing levels of the superdirectional sound pickup signal D, and the thick lines indicate mixing levels of the stereo sound pickup signals L and R. The symbols a–g in the upper portion of FIG. 9 denote the zoom positions of the reflector 22 shown in FIG. 2a.

Figure 10:
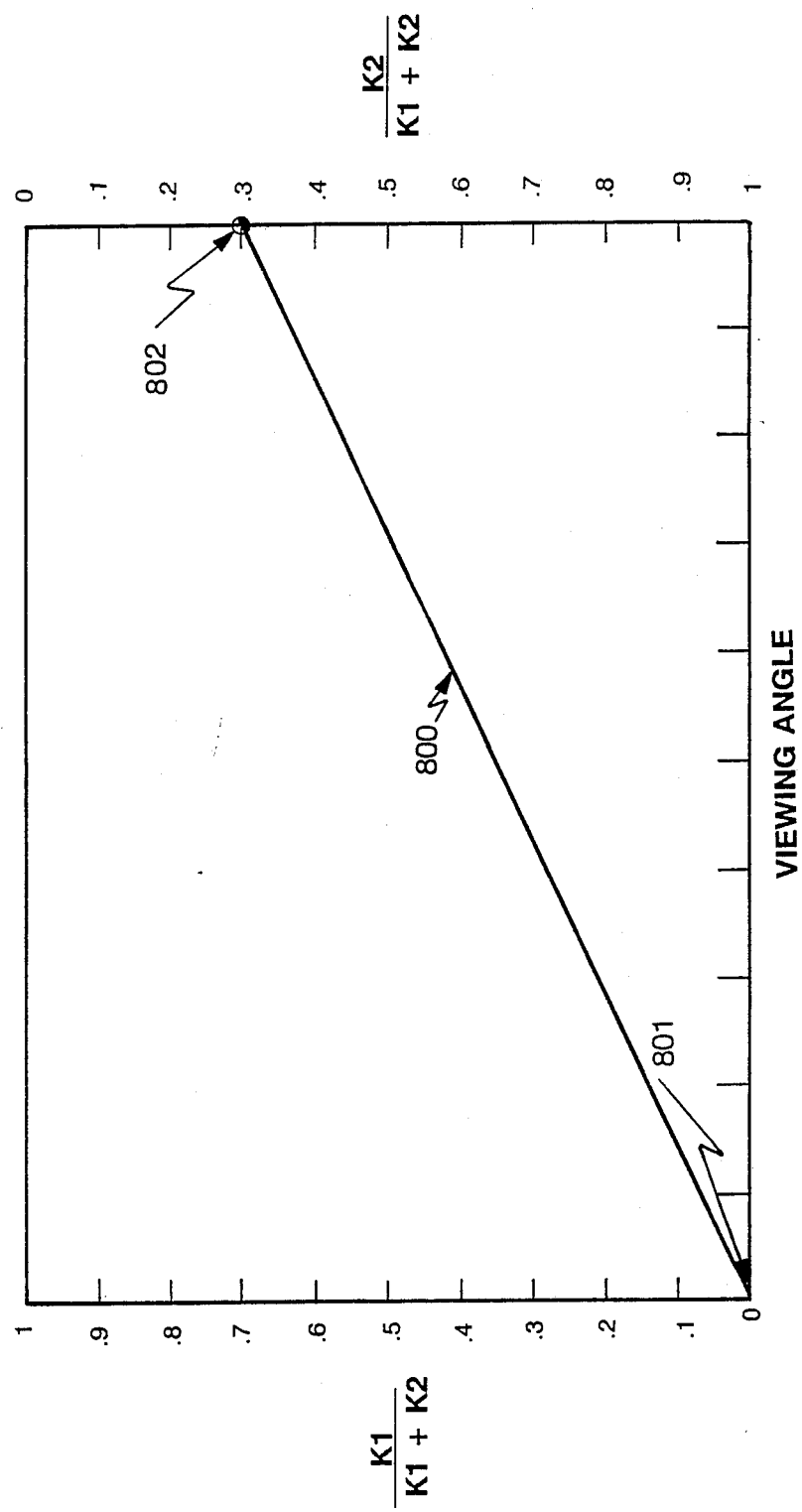
FIG. 10 is a graph showing another preferable relation between a viewing angle of the zoom lens and the mixing ratio of the superdirectional sound pickup signal to the stereo sound pickup signal.

FIG. 10 shows a preferable example of the mixing ratio of the superdirectional sound pickup signal D and the stereo sound pickup signals L and R to the current viewing angle of the zoom lens. A curve 800 shows the relation between the mixing ratio and the viewing angle. At the wide viewing angle zoom position 801, the mixing ratio of the stereo sound pickup signals L and R is set to 100%, and, at the telescopic zoom position 802, the mixing ratio of the superdirectional sound pickup signal D is set to 70% and that of the stereo sound pickup signals L and R is 30%. The mixing ratios of the signals are varied within the above-mentioned range in proportion to the variation in the viewing angle. By changing the mixing ratios according to the mixing ratio-viewing angle curve 800, the microphone apparatus can pick up the background sound even when the telescopic mode is set, resulting in that the presence property is enhanced when reproducing. This is very effective, in particular, in a so-called surround-reproducing system wherein two or three loudspeakers are arranged in the front and one or two speakers in the rear. The mixing ratio of the stereo sound pickup signals L and R at the telescopic zoom position may be set to 30%, but any level is acceptable as far as the stereo sound pickup signals L and R are included.

Figure 11:
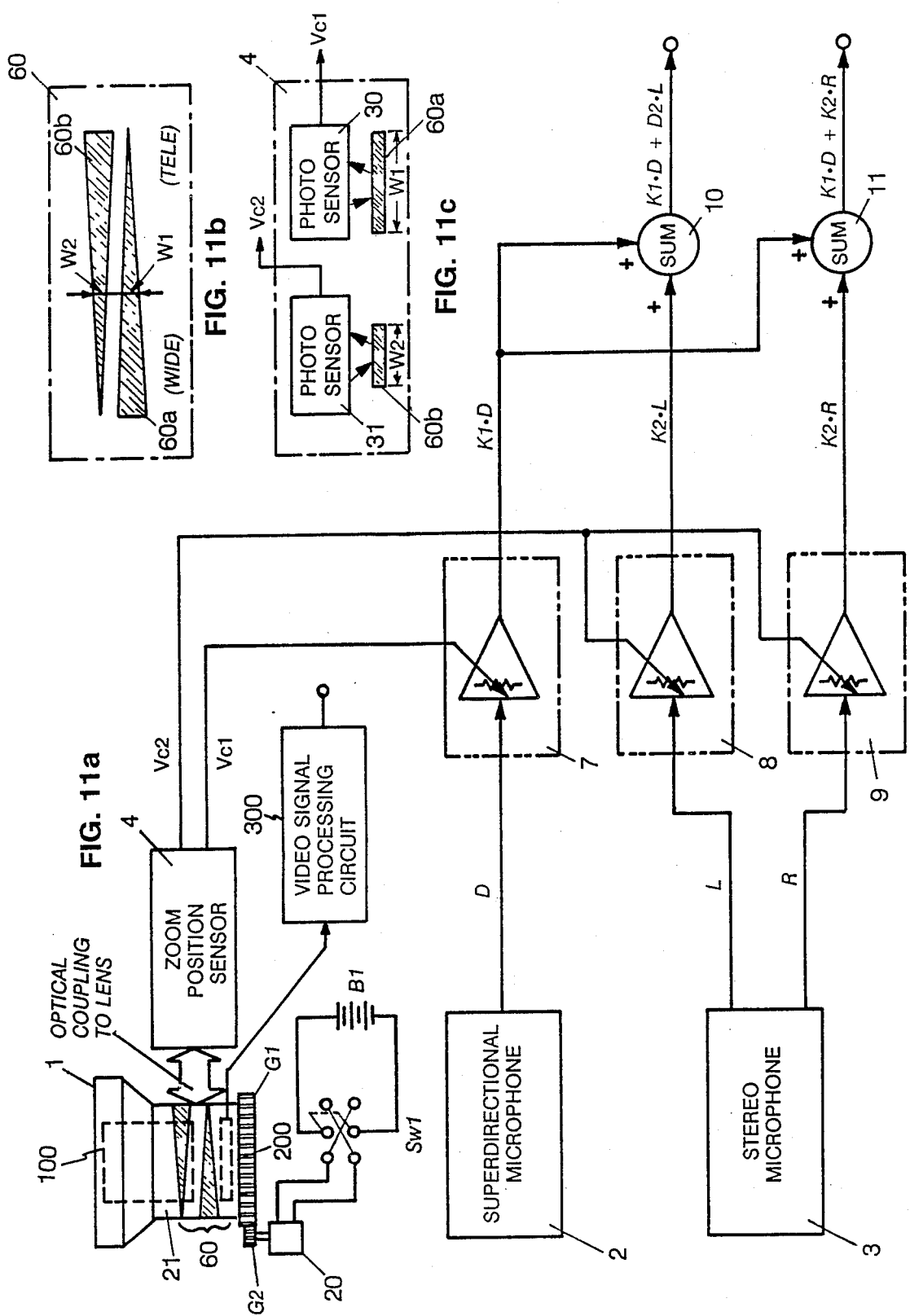

FIG. 11a illustrates another microphone apparatus according to the invention. The microphone apparatus of FIG. 11a is a modification of the apparatus of FIG. 1 in which the zoom position sensor 4 is an analog sensor so that the first and second control signal Vc1 and Vc2 can be directly obtained (i.e., the mixing control circuits 5 and 6 are omitted). Only the portions different from the apparatus of FIG. 1 will be described below. The outer surface of a zoom ring 21 which is formed by a black or low-reflection index material is covered by a reflector 60 The lateral direction in FIG. 11b corresponds to the rotation direction of the zoom ring 21, and the left end corresponds to the wide viewing angle zoom position and the right end to the telescopic zoom position. As shown in FIG. 11b the reflector 60 comprises first and second reflector areas 60a and 60b which are made from aluminum and disposed in a substantially parallel manner. The reflector areas 50a and 60b have a shape of a long triangle elongated along the rotation direction, and are disposed in a reverse parallel manner. In other words, with the rotation of zoom ring from the wide viewing position to the telescopic position, the widths W1 of the reflector are a 60a is gradually decreased, while the widths W2 of the reflector area 60b is gradually increased.

The zoom position sensor 4 is similar in structure to that used In the apparatus of FIG. 1, and comprises first and second reflection type photosensors 30 and 31 As shown in FIG. 11c, the first photosensor 30 is faced to the first reflector area 60a, and the second photosensor 31 is faced to the second reflector area 60b. The first photosensor 30 detects the amount of light reflected from the reflector area 60a to output the first control signal Vc1. The second photosensor 31 detects the amount of light reflected from the reflector area 60b to output the second control signal Vc2. The levels of the signals Vc1 and Vc2 respectively correspond to the width W1 of the first reflector area 60a and the width W2 of the second reflector area 60b. The widths W1 and W2 vary as the zoom ring 21 rotates, so that the level of each of the control signals Vc1 and Vc2 can be freely changed in accordance with the rotation angle of the zoom ring 21. For example, in FIG. 11b, the width W1 of the first reflector area 60a is wide, and the width W2 of the second reflector area 60b is narrow, at the wide viewing zoom position, and vice versa at the telescopic position.

At the wide viewing position, therefore, the output signal Vc1 from the first photosensor 30 is greater than the output signal Vc2 from the second photosensor 31. From the attenuation-control voltage curve 200 (FIG. 4), the attenuation of the superdirectional sound pickup signal D which depends on the control signal Vc1 is greater than the attenuation of the stereo sound Pickup signals L and R which depends on the control signal Vc2, thereby causing the mixing ratio of the stereo sound pickup signal L and R to be large. Conversely, at the telescopic position, the mixing ratio of superdirectional sound pickup signal D is large, since the width W1 of the first reflector area 60a is narrow and the width W2 of the second reflector area 60b is wide. The microphone apparatus of FIG. 11a has advantages that the simplified electric circuit can reduce the manufacturing cost, and that the apparatus can be continuously and finely controlled because the control signals Vc1 and Vc2 are not discrete ones.

Figure 12:
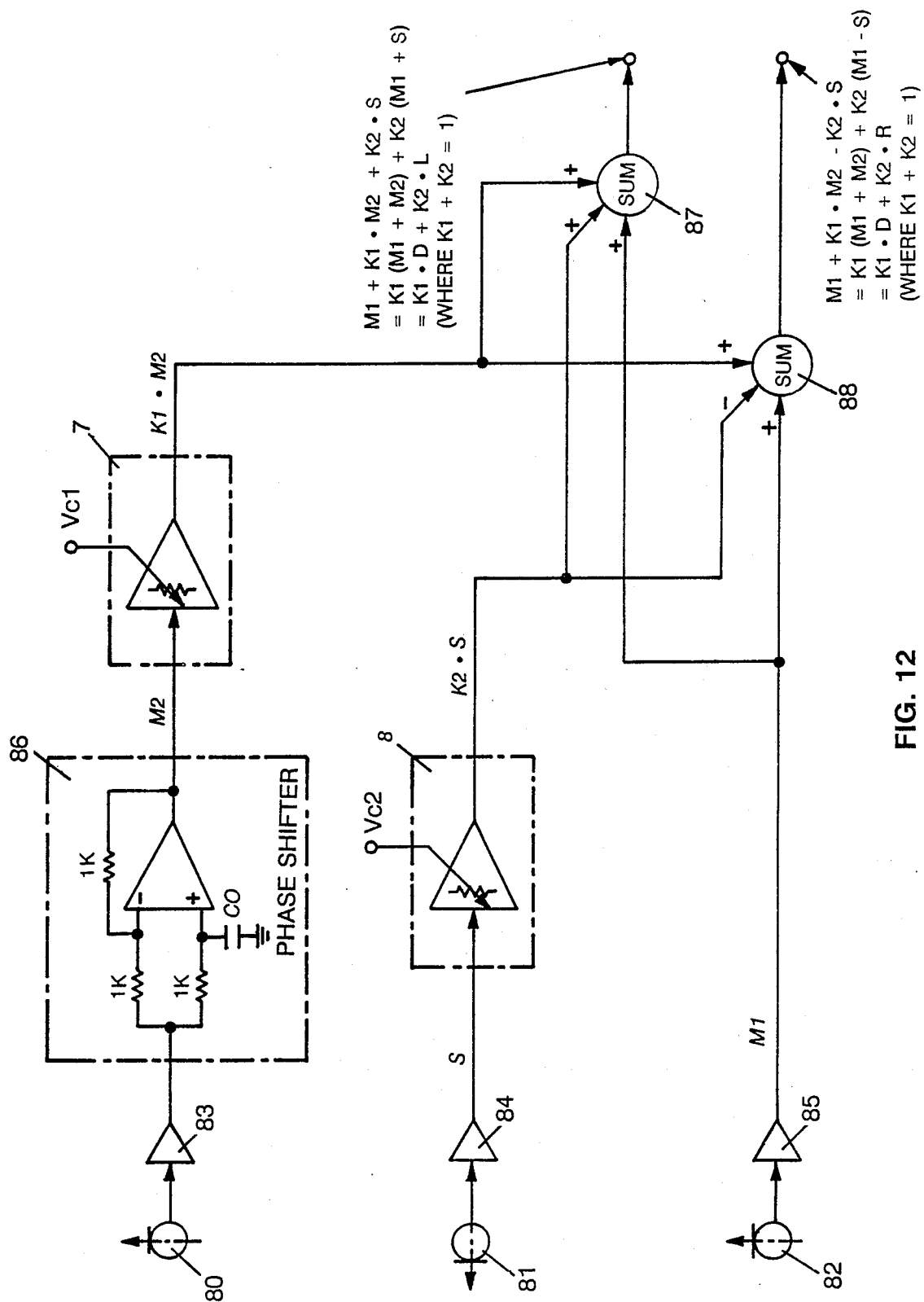
FIG. 12 is a block diagram of a further microphone apparatus according to the invention.

FIG. 12 illustrates a third example of the microphone apparatus of the invention. The microphone apparatus of FIG. 12 comprises two unidirectional microphones 80 and 82, a bidirectional microphone 81, three amplifiers 83–85, a phase shifter 86, and two adders 87 and 88. This apparatus can conduct simultaneously the generation of superdirectional sound pickup signal D and stereo sound pickup signal L and R, and the mixing of the signals, as described below. The means for obtaining the first and second control signals Vc1 and Vc2, which is not shown in FIG. 12, may be constructed in the same manner as that in the apparatus of FIG. 1 or FIG. 11a.

The first unidirectional microphone 80 is disposed in the manner that the principal axis of the directivity is directed toward the front of the apparatus. The second unidirectional microphone 82 is disposed 3 cm behind the first microphone 80. The principal axis of the directivity of the second microphone 82 is directed in the same direction as the first microphone 80. Between the first and second unidirectional microphones 80 and 82, and closer to the second microphone 82, the bidirectional microphone 81 is placed so that the principal axis of the directivity is perpendicular to the direction of the principal axis of the first unidirectional microphone 80. In FIG. 12, the direction the principal axis of each of the microphones 80–82 is indicated by an arrow. The microphones 80–82 may be compact electret condenser microphones having an impedance converter in which an electret material is used as a bias means.

The output signal of the first unidirectional microphone 80 is amplified by the first amplifier 83, and then phase-shifted by the phase shifter 86 to become a unidirectional sound pickup signal M2. The transfer function of the phase shifter 86 is given by $\{(1-j\omega\tau)/(1+j\omega\tau)\}$, where $\omega$ is an angular frequency, and $\tau$ is a time constant (which is a product of the resistance (1 kiloohms) and the capacitance CO in the phase shifter 86 shown in FIG. 12). The transfer function is 1 at a low frequency, and $-1$ at a high frequency. Therefore, the unidirectional sound pickup signal M2 is substantially the same as the output signal of the first unidirectional amplifier 80 in the low frequency region, and is a signal which is a phase-inverted signal of the output signal of the first unidirectional amplifier 80, in the high frequency region. The output signal of the bidirectional microphone 81 is amplified by the second amplifier 84 to become a bidirectional sound pickup signal S. The output signal of the second unidirectional microphone 82 is amplified by the third amplifier 85 to become a unidirectional sound pickup signal M1.

The unidirectional sound pickup signal M2 is multiplied by K1 by the amplifier 7 which is controlled by the second control signal Vc1, and then supplied to the adding terminals of the first and second adders 87 and 88. The bidirectional sound pickup signal S is multiplied by K2 by the amplifier 8 which is controlled by the second control signal Vc2, and then supplied to the adding terminal of the first adder 87 and also to the subtracting terminal of the second adder 88. The unidirectional sound pickup signal M1 is directly supplied to the adding terminals of the first and second adders 87 and 88.

The first adder 87 receives the level-controlled unidirectional sound pickup signal K1·M2, the level-controlled bidirectional sound pickup signal K2·S, and the unidirectional sound pickup signal M1, and add them to produce a composite signal (M1+K1·M2+K2·S). The second adder 88 also receives the signals K1·M2, K2·S and M1, and add or subtract them to produce a composite signal (M1·K1·M2−K2·S). As mentioned above, in the low frequency range, the unidirectional sound pickup signals M2 and M1 are in phase, and in the high frequency range their phases are reversed to each other. In the low frequency range, hence, the sum (M2+M1) is a in-phase addition of the outputs of the first and second unidirectional microphones 80 and 82, resulting in that the sum (M2+M1) is unidirectional (namely, the directivity of the sum agrees with the directivities of the microphones 80 and 82). By contrast, in the high frequency range, the sum (M2+M1) is a reverse-phase addition of the outputs of the first and second unidirectional microphones 80 and 82, resulting in that it shows a so-called second order pressure-gradient unidirectional property. When the capacitance CO in the phase shifter 86 is set large, the sum (M2+M1) shows a second order pressure-gradient unidirectional property in the whole frequency range. In this embodiment, the capacitance CO in the phase shifter 86 is selected so thai the sum (M2+M1) shows a unidirectional property at a low frequency ranging from 200 Hz to 300 Hz, and a second order pressure-gradient unidirectional property at a medium or high frequency ranging 1 kHz to 2kHz or more. That is, the sum (M2+M1) can be defined as a superdirectional sound pickup signal D which shows a second order pressure-gradient unidirectional property at a medium or high frequency. Further, the sum signal (M1+S) and difference signal (M1−S) of the unidirectional sound pickup signal M1 and the bidirectional sound pickup signal S are stereo sound pickup signals L and R of a so-Called MS (Mid-Side) type stereo microphone.

When the first and second control signals Vc1 and Vc2 are set so as to satisfy the relation of K1+K2=1 at each zoom positions or to conform to the mixing ratio-viewing angle curve 300 (FIG. 5). the composite signals (M1+K1·M2+K2·S) and (M1+K1·M2−K2·S) become equal to the output signals in the apparatus of FIG. 1 as follows:

$$(M1 + K1 \cdot M2 + K2 \cdot S) = K1(M1 + M2) + K2(M1 + S)$$
$$= K1 \cdot D + K2 \cdot L.$$
$$(M1 + K1 \cdot M2 - K2 \cdot S) = K1(M1 + M2) + K2(M1 - S)$$
$$= K1 \cdot D + K2 \cdot R.$$

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A microphone apparatus for a video camera having a zoom lens, comprising:
    a superdirectional sound pickup means for generating a directional sound pickup signal;
    a stereo sound pickup means for generating stereo sound pickup signals;
    a zoom position detection means for generating a zoom position signal which corresponds to the zoom position of said zoom lens;
    a first signal means for generating a first control signal the value of which is changed according to said zoom position signal;
    a second signal means for generating a second control signal the value of which is changed according to said zoom position signal;
    a first amplifying means for generating a first amplified signal, said first amplified signal being a product of said superdirectional sound pickup signal and a value which corresponds to said first control signal;
    a second amplifying means for generating a second amplified signal, said second amplified signal being a product of one of said stereo sound pickup signals and a value which corresponds to said second control signal;
    a third amplifying means for generating a third amplified signal, said third amplified signal being a product of another of said stereo sound pickup signals and a value which corresponds to said second control signal;
    a first adding means for generating a first sum signal which is the sum of said first amplified signal and said second amplified signal; and
    a second adding means for generating a second sum signal which is the sum of said first amplified signal and said third amplified signal.

2. A microphone apparatus according to claim 1, wherein said zoom position detection means detects the zoom position of said zoom lens without making mechanical contact with said zoom lens.

3. A microphone apparatus according to claim 1, wherein said zoom position detection means comprises:
    a plurality of reflector areas formed on the outer periphery of a zoom ring of said zoom lens, each of said reflector areas being composed of a row of one or more high reflection index portions and one or more low reflection index portions;
    a light emitting means for irradiating light on said reflector area; and
    a light receiving means for detecting light reflected from each reflector areas,
    said zoom position signal being a digital signal of two or more bits which is produced from binary signals representing the reflection index of said reflector areas.

4. A microphone apparatus according to claim 1, wherein said first and second signal means comprise an analog multiplexer which selects one of channels in accordance with a digital signal, and each of said first and second control signals is a DC signal the level of which corresponds to said selected channel.

5. A microphone apparatus according to claim 1, wherein said first and second signal means comprise: an analog multiplexer which selects one of channels in accordance with a digital signal; a reference voltage source connected to the common terminal of said analog multiplexer; resistors one e nd of each of which is connected corresponding one of said channels of said analog multiplexer; and a reference resistor, one end of said reference resistor being connected to other end of each of said resistors, and the other end of said reference resistor being grounded.

6. A microphone apparatus according to claim 1, wherein, at the wide viewing angle zoom position of said zoom lens, the mixing ratio of said stereo sound pickup signals is set to 100%, and the mixing ratio of said superdirectional sound pickup signal is set to 0%, and, at the telescopic zoom position of said zoom lens, the mixing ratio of said stereo sound pickup signals is set to 0%, and the mixing ratio of said superdirectional sound pickup signal is set to 100%, said mixing ratios being varied within said ranges in proportion to the variation of the viewing angle of said zoom lens.

7. A microphone apparatus according to claim 1, wherein, said first and second sum signals are varied in proportion to a power of a zooming magnification of said zoom lens.

8. A microphone apparatus according to claim 1, wherein, said first and second sum signals are varied in proportion to a power ranging 0.3 to 0.5 of a zooming magnification of said zoom lens.

9. A microphone apparatus according to claim 1, wherein, at the wide viewing angle zoom position of said zoom lens, the mixing ratio of said stereo sound pickup signals and is set to 100%, and the mixing ratio of said superdirectional sound pickup signal is set to 0%, and, at the telescopic zoom position of said zoom lens, the mixing ratio of said superdirectional sound pickup signal is set to be larger than the mixing ratios of said stereo sound pickup signals, said mixing ratios being varied within said ranges in proportion to the variation of the viewing angle of said zoom lens.

10. A microphone apparatus according to claim 1, wherein said zoom position detection means comprises:
two reflector areas formed on the outer periphery of a zoom ring of said zoom lens, each of said reflector areas being formed by a material of a high reflection index material and having a triangle shape which elongates along the rotation direction of said zoom ring;
a light emitting means for irradiating light on said reflector areas; and
a light receiving means for detecting light reflected from each reflector areas,
and said first and second control signals are analog signals.

11. A microphone apparatus for a video camera having a zoom lens, comprising:
a superdirectional sound pickup means for generating a directional sound pickup signal;
a stereo sound pickup means for generating stereo sound pickup signals;
a zoom position detection means for generating first and second analog control signals the level of each of which is changed according to the zoom position of said zoom lens;
a first amplifying means for generating a first amplified signal, said first amplified signal being a product of said superdirectional sound pickup signal and a value which corresponds to said first control signal;
a second amplifying means for generating a second amplified signal, said second amplified signal being a product of one of said stereo sound pickup signals and a value which corresponds to said second control signal;
a third amplifying means for generating a third amplified signal, said third amplified signal being a product of another of said stereo sound pickup signals and a value which corresponds to said second control signal;
a first adding means for generating a first sum signal which is the sum of said first amplified signal and said second amplified signal; and
a second adding means for generating a second sum signal which is the sum of said first amplified signal and said third amplified signal.

12. A microphone apparatus according to claim 11, wherein said zoom position detection means comprises:
two reflector areas formed on the outer periphery of a zoom ring of said zoom lens, each of said reflector areas being formed by a material of a high reflection index material and having a shape of a triangle, said two triangles being elongated in a reversed parallel manner along the rotation direction of said zoom ring;
a light emitting means for irradiating light on said reflector areas; and
a light receiving means for detecting light reflected from each reflector areas.

13. A microphone apparatus for a video camera having a zoom lens, comprising:
a first unidirectional microphone the principal axis of whiCh is directed to the front of said apparatus;
a second unidirectional microphone the principal axis of which is directed to the front of said apparatus said second unidirectional microphone being disposed behind said first unidirectional microphone and separated therefrom by a predetermined distance;
a bidirectional microphone the principal axis of which is perpendicular to the direction of the principal axis of said first unidirectional microphone, said bidirectional microphone being disposed between said first and second unidirectional microphones and closer to said second unidirectional microphone;
a first amplifying means for amplifying the output of said first unidirectional microphone;
a phase shifter for generating a first unidirectional sound pickup signal which is obtained by phase-shifting the output of said first amplifying means;
a second amplifying means for amplifying the output of said bidirectional microphone to generate a bidirectional sound pickup signal:
a third amplifying means for amplifying the output of said second unidirectional microphone to generate a second unidirectional sound pickup signal;
a zoom position detection means for generating a zoom position signal which corresponds to the zoom position of said zOom lens;
a first signal means for generating a first control signal the value of which is changed according to said zoom position signal;
a second signal means for generating a second control signal the value of which is changed according to said zoom position signal;
a fourth amplifying means for generating a first amplified signal, said first amplified signal being a product of said superdirectional sound pickup signal and a value which corresponds to said first control signal;

a fifth amplifying means for generating a second amplified signal, said second amplified signal being a product of said bidirectional sound pickup signal and a value which corresponds to said second control signal;

a first adding means for generating a first sum signal which is the sum of said second unidirectional sound pickup signal, said first amplified signal and said second amplified signal; and a second adding means for generating a second sum signal which is obtained by subtracting said second amplified signal from the sum of said second unidirectional sound pickup signal and said first amplified signal.

14. A microphone apparatus according to claim 13, wherein said zoom position detection means detects the zoom position of said zoom lens without making mechanical contact with said zoom lens.

15. A video camera comprising:

a zoom lens the focal length of which can be changed in accordance with the rotation of a zoom ring;

a microphone apparatus;

a photoelectric converter for converting optical images formed by said zoom lens into electric signals; and a image signal means for generating image signals from said electric signals, said microphone apparatus comprising:

a superdirectional sound pickup means for generating a directional sound pickup signal;

a stereo sound pickup means for generating stereo sound pickup signals;

a zoom position detection means for generating a zoom position signal which corresponds to the zoom position of said zooms lens;

a first signal means for generating a first control signal the value of which is changed according to said zoom position signal;

a second signal means for generating a second control signal the value of which is changed according to said zoom position signal;

a first amplifying means for generating a first amplified signal, said first amplified signal being a product of said superdirectional sound pickup signal and a value which corresponds to said first control signal;

a second amplifying means for generating a second amplified signal, said second amplified signal being a product of one of said stereo sound pickup signals and a value which corresponds to said second control signal;

a third amplifying means for generating a third amplified signal, said third amplified signal being a product of another of said stereo sound pickup signals and a value which corresponds to said second control signal;

a first adding means for generating a first sum signal which is the sum of said first amplified signal and said second amplified signal; and a second adding means for generating a second sum signal which is the sum of said first amplified signal and said third amplified signal.

* * * * *

UNITED STATES PATENT AND TRADEMARK OFFICE
CERTIFICATE OF CORRECTION

PATENT NO. : 4,984,087

DATED : January 8, 1991

INVENTOR(S) : Katsunori Fujimura et al.

It is certified that error appears in the above-identified patent and that said Letters Patent is hereby corrected as shown below:

In the Drawings:

Fig. 1, "D2·L" should read --K2·L--.

Fig. 3, "$X_1O$" should read --$X_1$-- both occurrences, and

"$X_2O$" should read --$X_2$-- both occurrences, and

"$X_3O$" should read --$X_3$-- both occurrences, and

"$X_4O$" should read --$X_4$-- both occurrences, and

"$X_5O$" should read --$X_5$-- both occurrences, and

"$X_6O$" should read --$X_6$-- both occurrences, and

"$X_7O$" should read --$X_7$-- both occurrences, and

"$X_8O$" should read --$X_8$--, and on the left side of the Figure, under $X_7$, after the "O", insert --$X_8$--.

Fig. 4, after "CONTROL VOLTAGE", insert --[V]--.

Fig. 11a, "D2·L" should read --K2·L--.

Signed and Sealed this

Twenty-eighth Day of July, 1992

Attest:

DOUGLAS B. COMER

Attesting Officer

Acting Commissioner of Patents and Trademarks